US006955469B2

United States Patent
Gomyo

(10) Patent No.: US 6,955,469 B2
(45) Date of Patent: Oct. 18, 2005

(54) DYNAMIC PRESSURE BEARING DEVICE

(75) Inventor: Masato Gomyo, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 1 day.

(21) Appl. No.: 10/292,371

(22) Filed: Nov. 12, 2002

(65) Prior Publication Data

US 2003/0091250 A1 May 15, 2003

(30) Foreign Application Priority Data

Nov. 14, 2001 (JP) .............................. 2001-349402

(51) Int. Cl.$^7$ ............................................. F16C 17/10
(52) U.S. Cl. ....................... 384/107; 384/112; 384/123
(58) Field of Search ............................... 384/100, 107, 384/112, 101, 123

(56) References Cited

U.S. PATENT DOCUMENTS

| | | | | |
|---|---|---|---|---|
| 4,892,418 A | * | 1/1990 | Asada et al. ................ 384/124 |
| 5,328,272 A | * | 7/1994 | Ainslie et al. .............. 384/112 |
| 5,427,456 A | * | 6/1995 | Hensel ........................ 384/112 |
| 5,433,529 A | * | 7/1995 | Hensel ........................ 384/112 |
| 5,524,985 A | * | 6/1996 | Dunfield ..................... 384/107 |
| 5,536,088 A | * | 7/1996 | Cheever et al. ............. 384/107 |
| 5,658,080 A | * | 8/1997 | Ichiyama .................... 384/112 |
| 5,770,906 A | * | 6/1998 | Hazelton et al. ............ 310/90 |
| 5,977,676 A | * | 11/1999 | Wijdenes .................... 310/90 |
| 6,017,150 A | * | 1/2000 | Lee ............................. 384/123 |
| 6,183,135 B1 | * | 2/2001 | Kloeppel et al. ........... 384/112 |

FOREIGN PATENT DOCUMENTS

| JP | 2002-061647 | 2/2002 |
|---|---|---|
| JP | 2003-269443 | 9/2003 |

* cited by examiner

Primary Examiner—Thomas R. Hannon
(74) Attorney, Agent, or Firm—Hogan & Hartson, LLP

(57) ABSTRACT

A dynamic pressure bearing device includes a dynamic pressure bearing member, a rotary member that is rotatable with respect to the dynamic pressure bearing member, a thrust dynamic pressure bearing section provided in a thrust opposing region that is between an end surface in an axial direction of the dynamic pressure bearing member and an end surface in the axial direction of the rotary member, and a pumping device provided in the thrust opposing region. The thrust dynamic pressure bearing section rotatably supports the rotary member in the axial direction of the rotary member, and the pumping device provided in the thrust opposing region pressurizes a lubricating fluid inside the thrust opposing region inwardly in a radial direction, wherein the pumping device generates an inward pressurizing force larger than a rotational centrifugal force applied to the lubricating fluid within the thrust opposing region during rotation.

20 Claims, 5 Drawing Sheets

DYNAMIC PRESSURE BEARING DEVICE

BACKGROUND OF THE INVENTION

1. Field of the Invention

The present invention relates to dynamic pressure bearing devices each equipped with a dynamic pressure bearing member that supports a rotation shaft with dynamic pressure generated by lubricating fluid, and the present invention also relates to motors equipped with such dynamic pressure bearing devices.

2. Related Background Art

In recent years, the development of dynamic pressure bearing devices in which rotation shafts are supported by having lubricating fluid generate dynamic pressure has been underway in order to create bearing devices that can rotate rotary bodies at high-speed and high precision in various types of rotary drive devices. In such dynamic pressure bearing devices, those having a thrust bearing section SB structured as indicated in FIGS. 8 and 9, for example, have been recently proposed in order to make the entire device thinner. With respect to the thrust bearing section SB indicated in these figures, a rotary member 3 is attached to a rotary shaft 2, which is supported in a freely rotatable manner by a dynamic pressure bearing member 1, and an inner end surface (bottom end surface) in the axial direction at the center part of the rotary member 3 is positioned opposite and in close proximity in the axial direction to an inner end surface (top end surface) of the dynamic pressure bearing member 1, thereby forming the thrust bearing section SB.

In the interior of the thrust dynamic pressure bearing section SB, an appropriate amount of a lubricating fluid (omitted from drawings) is filled and herringbone-shaped dynamic pressure generating grooves 4, for example, are formed concavely in a ring shape as a dynamic pressure generating means for the lubricating fluid, so that the pressurizing effect of the dynamic pressure generating grooves 4 causes dynamic pressure to be generated in the lubricating fluid and thereby yields a predetermined levitation force in the axial direction.

In order to effectively yield levitation force in the axial direction with the thrust dynamic pressure bearing section SB, it is desirable to set the pressurizing effect of the dynamic pressure generating grooves 4 inward in the radial direction (towards the center). Consequently, as indicated by arrows in FIG. 8, the pressurizing effect (i.e., the pumping effect) of groove sections 4a on the outer side in the radial direction is normally set larger than the pressurizing effect of groove sections 4b on the inner side in the radial direction, where the two sets of groove sections 4a and 4b comprise the dynamic pressure generating grooves 4, and the pressure difference between the two causes the lubricating fluid to be sent towards the center.

In the meantime, a fluid sealing section 5 comprising a capillary sealing section or the like is formed adjacent to an area on the outer side in the radial direction of the thrust dynamic pressure bearing section SB, in order to prevent the lubricating fluid within the thrust dynamic pressure bearing section SB from flowing out. The fluid sealing section 5 can be formed by making use of an outer circumference wall surface of the dynamic pressure bearing member 1, for example; more specifically, a tapered sealing space is created by forming an appropriate gap between the outer circumference wall surface of the dynamic pressure bearing member 1 and an inner circumference wall surface of a counter plate 6, which is attached to the rotary member 3 to serve also as a fall-out stopper member, and by gradually enlarging the gap towards an opening section at the bottom.

In forming the thrust dynamic pressure bearing section SB having such a structure, it is naturally desirable to reduce torque loss that occurs in the thrust dynamic pressure bearing section SB, and to that end efforts have been made to make the outer bearing diameter of the thrust dynamic pressure bearing section SB as small as possible. In other words, positioning the thrust dynamic pressure bearing section SB in the center part of an entire thrust opposing region that is formed between the end surface in the axial direction of the rotary member 3 and the end surface in the axial direction of the dynamic pressure bearing member 1 has been practiced for some time.

However, when the outer diameter of the thrust dynamic pressure bearing section SB is small, the pressurizing force (the pumping force) of the thrust dynamic pressure bearing section SB inward in the radial direction fails to work on the lubricating fluid that is in a region more outward in the radial direction than the thrust dynamic pressure bearing section SB; consequently, the lubricating fluid that is in the region more outward in a radial direction than the thrust dynamic pressure bearing section SB may scatter to the outside of the bearing (on the outer side in the radial direction) due to centrifugal force from rotation.

The rotational centrifugal force applied to the lubricating fluid is proportional to a square of rotational speed; consequently, when high-speed rotation of over 10,000 rpm takes place as in latest rotary drive devices, an extremely large centrifugal force is applied to the lubricating fluid, which makes it easy for the lubricating fluid to be scattered; the holding power of the fluid sealing section 5 may not be able to support this and there is a greater risk of the lubricating fluid leaking outside. When the lubricating fluid leaks outside, the amount of the lubricating fluid becomes insufficient inside the bearing by the amount leaked, which can shorten the life of the dynamic pressure bearing device. Further, in devices that require highly clean environment such as HDD (hard disk drive devices), the leaking of the lubricating fluid can cause contamination of internal equipment and lead to fatal problems for the entire device.

One way to prevent the lubricating fluid from leaking outside of the thrust dynamic pressure bearing section SB is to make gaps between members positioned near the thrust dynamic pressure bearing section SB narrow, but this causes rotational torque loss in narrowed pathway sections, which can lead to such problems as increased drive current.

SUMMARY OF THE INVENTION

In view of the above, the present invention provides dynamic pressure bearing devices with simple configurations that can effectively prevent lubricating fluid from leaking outside of thrust dynamic pressure bearing sections SB.

In order to solve the problem described above, in a dynamic pressure bearing device according to the present invention, a pumping device is provided in an outer circumference part of a thrust opposing region that is between an end surface in the axial direction of a dynamic pressure bearing member and an end surface in the axial direction of a rotary member, such that the pumping device pressurizes inward in the radial direction a lubricating fluid inside the thrust opposing region, and where the pumping device is configured to generate an inward pressurizing force larger than a rotational centrifugal force applied to the lubricating fluid within the thrust opposing region during rotation.

In other words, with the dynamic pressure bearing device having such a configuration described above, there is a pressurizing force applied by the pumping device at all times inward in the radial direction (towards the center) at the outer circumference part of the entire thrust opposing region, including a thrust dynamic pressure bearing section; consequently, even if high-speed rotation were to take place in a configuration in which the thrust dynamic pressure bearing section has a small diameter to reduce torque loss, the inward pressurizing force of the pumping device securely prevents the lubricating fluid from leaking outside.

In a dynamic pressure bearing device in accordance with the embodiment of the present invention, the pumping device may be provided separately from the thrust dynamic pressure bearing section and may be positioned in a region more outward in the radial direction than the thrust dynamic pressure bearing section, such that the thrust dynamic pressure bearing section has a structure that experiences less torque loss and the lubricating fluid is effectively prevented from leaking outside.

Further in the dynamic pressure bearing device according to the embodiment of the present invention, a dynamic pressure generating device of the thrust dynamic pressure bearing section may consist of herringbone-shaped dynamic pressure generating grooves, and the pumping device may consist of spiral-shaped dynamic pressure generating grooves, such that the thrust dynamic pressure bearing section having a structure similar to conventional thrust dynamic pressure bearing sections can be easily formed, while the configuration of the pumping device that effectively prevents the lubricating fluid from leaking outside can be made simple.

Moreover, in the dynamic pressure bearing device in accordance with the embodiment of the present invention, due to the fact that a dynamic pressure generating device of the thrust dynamic pressure bearing section may be provided to serve also as a pumping device. As a result, the overall structure is simplified.

In the dynamic pressure bearing device according to the present invention, the dynamic pressure generating device of the thrust dynamic pressure bearing section that also serves as the pumping device may consist of herringbone-shaped dynamic pressure generating grooves made up of groove sections on the outer side in the radial direction and groove sections on the inner side in the radial direction. Further, the width in the radial direction of the groove sections on the outer side in the radial direction may be larger than the width in the radial direction of the groove sections on the inner side in the radial direction of the herringbone-shaped dynamic pressure generating grooves. Consequently, by merely molding ordinary herringbone-shaped dynamic pressure generating grooves in an asymmetrical manner, bearing performance equal to or greater than conventional bearing performance can be obtained, while effectively preventing the lubricating fluid from leaking outside.

Further in the dynamic pressure bearing device according to the embodiment of the present invention, the pumping device may consist of spiral-shaped dynamic pressure generating grooves and the pumping device may also serve as a dynamic pressure generating device for the thrust dynamic pressure bearing section. As a result, the dynamic pressure bearing device having an extremely simple and low-cost structure can have a lubricating fluid generate dynamic pressure for thrust levitation and effectively prevent the lubricating fluid from leaking outside.

Moreover, in the dynamic pressure bearing device in accordance with the embodiment of the present invention, the fluid sealing section may consist of a capillary sealing section formed by an outer circumference wall surface of a dynamic pressure bearing member, a lubricating fluid is continuously filled in an area defined by a thrust dynamic pressure bearing section and a capillary sealing section. Consequently, sufficient lubricating fluid is secured for the thrust dynamic pressure bearing section, and bums and scuffing are effectively prevented by the presence of the lubricating fluid even when members in the area defined by the thrust dynamic pressure bearing section and the capillary sealing section come into contact with each other.

Other objects, features and advantages of the invention will become apparent from the following detailed description taken in conjunction with the accompanying drawings.

DETAILED DESCRIPTION OF THE PREFERRED EMBODIMENTS

Embodiments of the present invention are described in detail below based on drawings, but a description will be made first as to an overview of a hard disk drive device (HDD) as an example to which dynamic pressure bearing devices according to the present invention are applied.

Figure 1:
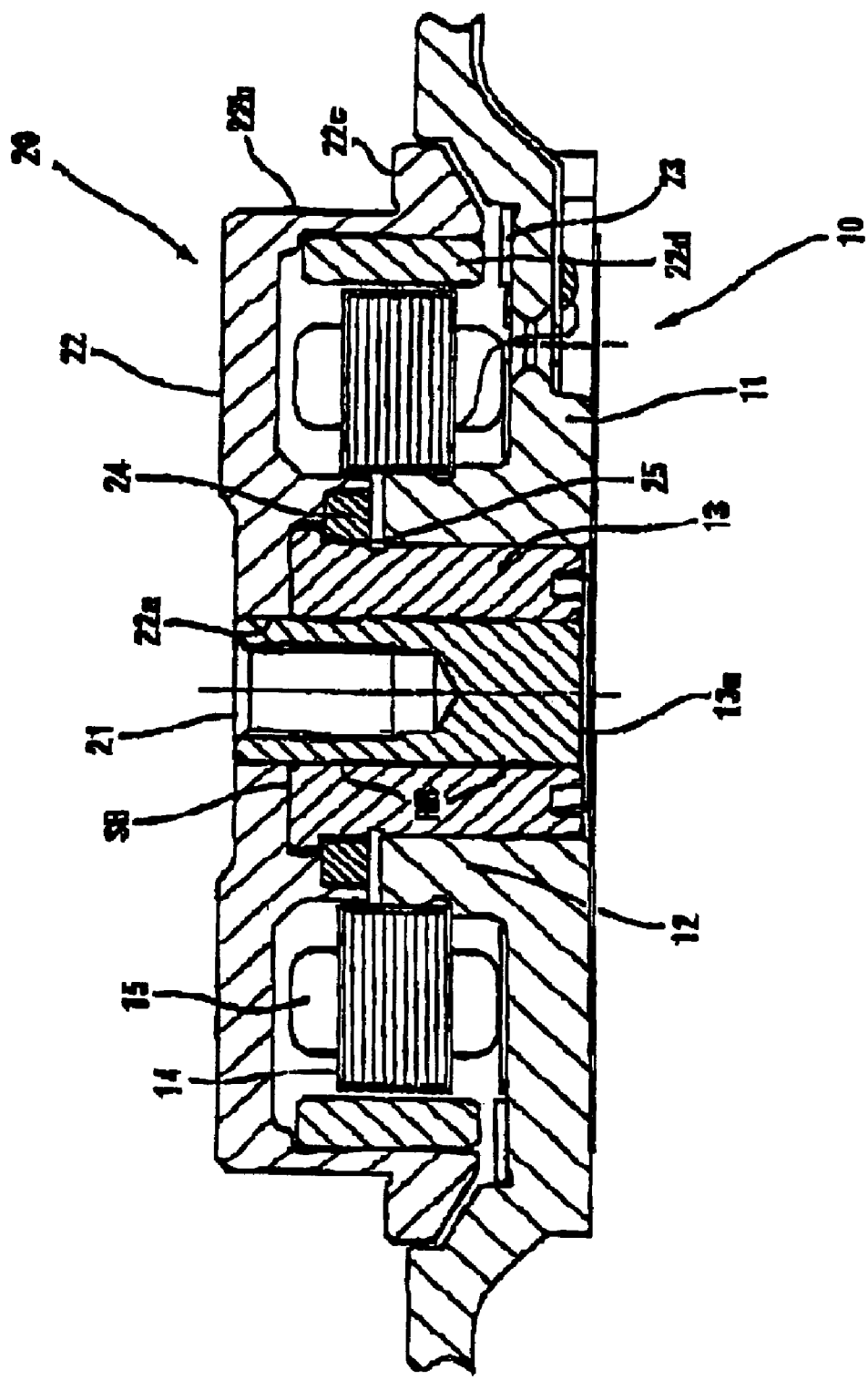
FIG. 1 schematically shows a longitudinal cross section of a shaft rotation-type HDD spindle motor with a dynamic pressure bearing device in accordance with an embodiment of the present invention.

The overall view of a shaft rotation-type HDD device shown in FIG. 1 comprises a stator assembly 10, which is a fixed member, and a rotor assembly 20, which is a rotary member assembled onto the top of the stator assembly 10. The stator assembly 10 has a fixed frame 11, which is screwed to a fixed base omitted from drawings. The fixed frame 11 may be formed from an aluminum material to achieve a lighter weight; on the inner circumference surface of a ring-shaped bearing holder 12 formed upright in the generally center part of the fixed frame 11 is a bearing sleeve 13, which is a fixed bearing member formed in the shape of a hollow cylinder and joined to the bearing holder 12 through press fitting or shrink fitting. The bearing sleeve 13 may be formed with a copper material such as phosphor bronze in order to more easily machine holes with small diameters.

A stator core 14, which consists of a laminate of electromagnetic steel plates is mounted on the outer circumference mounting surface of the bearing holder 12, and a drive coil 15 is wound on each salient pole section provided on the stator core 14.

A rotary shaft 21 that comprises the rotor assembly 20 is inserted in a center hole provided in the bearing sleeve 13 in a freely rotatable manner. This means that a dynamic pressure surface formed on an outer circumference surface of the rotary shaft 21 and a dynamic pressure surface formed on an inner circumference wall section of the bearing sleeve 13 are positioned opposite each other in the radial direction, and two radial dynamic pressure bearing sections RB and RB are formed in minuscule gap sections between them with an appropriate interval between the two radial dynamic pressure bearing sections RB and RB in the axial direction. More specifically, the dynamic pressure surface on the bearing sleeve 13 side and the dynamic pressure surface on the rotary shaft 21 side of each of the radial dynamic pressure bearing sections RB are positioned opposite each other in a circular fashion across a minuscule gap of several micrometers, and a lubricating fluid such as a lubricating oil, magnetic fluid or air is filled or present in a continuous manner in the axial direction in a bearing space formed by the minuscule gap.

On at least one of the dynamic pressure surfaces of the bearing sleeve 13 or the rotary shaft 21 are provided herringbone-shaped radial dynamic pressure generating grooves, for example, that are concavely formed in a ring shape in two blocks separated in the axial direction. During rotation, a pumping effect of the radial dynamic pressure generating grooves pressurizes the lubricating fluid, which is omitted from drawings, to generate dynamic pressure, and a rotary hub 22, which is described later, together with the rotary shaft 21 become shaft-supported in the radial direction in a non-contact state with the bearing sleeve 13 due to the dynamic pressure of the lubricating fluid.

Figure 2:
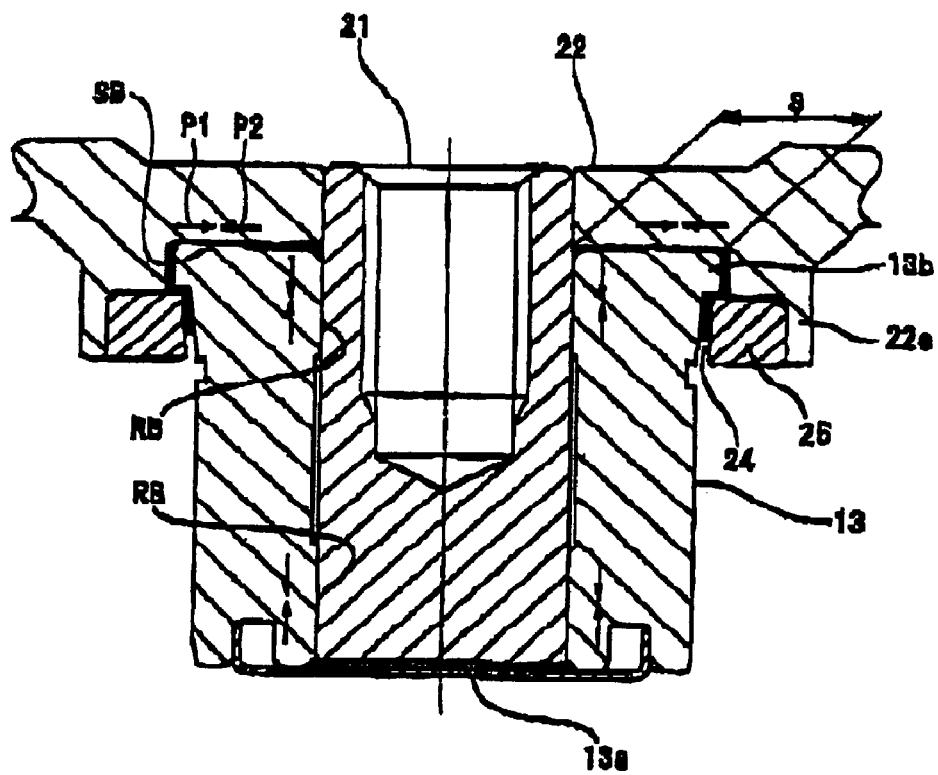
FIG. 2 shows an enlarged longitudinal cross section of the dynamic pressure bearing device used in the HDD spindle motor shown in FIG. 1.

The pumping effect in each of the radial dynamic pressure bearing sections RB is balanced in the axial direction as indicated by arrows especially in FIG. 2, so that the balanced pumping effect in each of the radial dynamic pressure bearing sections RB does not cause the lubricating fluid to be pushed in either direction in the axial direction.

The rotary hub 22 that with the rotary shaft 21 comprises the rotor assembly 20 is a generally cup-shaped member made of an aluminum metal, and a joining hole 22a provided in the center part of the rotary hub 22 is joined in a unitary fashion with the top end part of the rotary shaft 21 through press fitting or shrink fitting. The rotary hub 22 has a body section 22b, which is generally cylindrically-shaped and serves to mount a recording medium disk such as a magnetic disk omitted from drawings on the outer circumference section, as well as a disk mounting section 22c, which projects outward in the radial direction from the body section 22b to support the recording medium disk in the axial direction; and the recording medium disk is fixed by a pressure applied from above in the drawing with a damper (omitted from drawings) that is screwed on from above.

On the inner circumference wall surface of the body section 22b of the rotary hub 22 is mounted a ring-shaped drive magnet 22d via a back yoke. The inner circumference surface of the ring-shaped drive magnet 22d is positioned in a ring-shaped manner in close proximity to and opposite the outer circumference end surface of each of the salient poles of the stator core 14, while a bottom end surface in the axial direction of the ring-shaped drive magnet 22d is positioned opposite in the axial direction to a magnetic attraction plate 23 that is attached to the fixed frame 11; the magnetic attraction force between the members 22d and 23 causes the entire rotary hub 22 to be attracted in the axial direction, so that a stable rotating state can be obtained.

In the meantime, an opening section provided at the bottom end of the bearing sleeve 13 is closed off by a cover 13a, and this prevents the lubricating fluid inside each of the radial dynamic pressure bearing sections RB from leaking outside.

Figure 3:
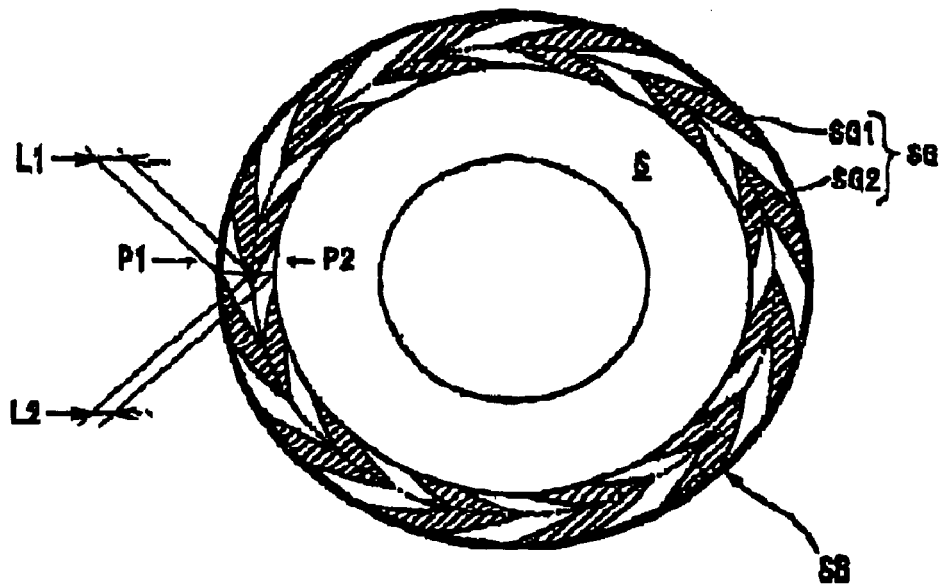
FIG. 3 shows a plan view of the shape of thrust dynamic pressure generating grooves provided in the dynamic pressure bearing section shown in FIG. 2.

A top end surface of the bearing sleeve 13 and a bottom end surface in the center part of the rotary hub 22 are positioned in close proximity to and opposite each other in the axial direction, and a thrust dynamic pressure bearing section SB is provided in one part of a thrust opposing region S between the top end surface of the bearing sleeve 13 and the bottom end surface of the rotary hub 22. In other words, on at least one of the opposing dynamic pressure surfaces 13 and 22 that comprise the thrust opposing region S are formed herringbone-shaped thrust dynamic pressure generating grooves SG, as indicated especially in FIG. 3, and opposing parts in the axial direction that include the thrust dynamic pressure generating grooves SG comprise the thrust dynamic pressure bearing section SB.

The dynamic pressure surface on the top end surface of the bearing sleeve 13 and the opposing dynamic pressure surface in close proximity on the bottom end surface of the rotary hub 22, where the two dynamic pressure surfaces comprise the thrust dynamic pressure bearing section SB, are positioned opposite each other in the axial direction across a minuscule gap of several micrometers; the lubricating fluid such as oil, magnetic fluid or air is filled continuously from the radial dynamic pressure bearing sections RB into the bearing space comprising the minuscule gap; during rotation, a pumping effect of the thrust dynamic pressure generating grooves SG pressurizes the lubricating fluid to generate dynamic pressure; and the dynamic pressure of the lubricating fluid causes the rotary shaft 21 and the rotary hub 22 to be shaft-supported levitating in the thrust direction and in a non-contact state.

When this happens, the thrust dynamic pressure bearing section SB is positioned at the outermost circumference side of the thrust opposing region S between the top end surface of the bearing sleeve 13 and the bottom end surface of the rotary hub 22; and at the outermost circumferential part of the thrust opposing region S, the thrust dynamic pressure bearing section SB also serves as a pumping device that pressurizes inward in the radial direction the lubricating fluid that is present throughout the thrust opposing region S including the thrust dynamic pressure bearing section SB.

That is, the herringbone-shaped thrust dynamic-pressure generating grooves SG provided in the thrust dynamic pressure bearing section SB consist of outer groove sections SG1 on the outer side in the radial direction and inner groove sections SG2 on the inner side in the radial direction, where the outer groove sections SG1 and the inner groove sections SG2 are linked in a generally V-shape when viewed in a plane view; of the herringbone-shaped groove sections SG1 and SG2, a width L1 in the radial direction of the outer groove sections SG1 is wider by an appropriate amount than a width L2 in the radial direction of the inner groove sections SG2 on the inner side in the radial direction (L1>L2), so that a pressurizing force (a pumping force P1) of the outer groove sections SG1 inward in the radial direction (towards the center) is larger by an appropriate amount than a pressurizing force (a pumping force P2) of the inner groove sections SG2 outward in the radial direction (P1>P2).

As a result, the pressure difference (P1–P2) between the pressurizing forces of the groove sections SG1 and SG2 is set as a force towards the center, which causes the lubricating fluid in the thrust opposing region S including the thrust dynamic pressure bearing section SB to be pressurized inward in the radial direction (towards the center). In this way, the thrust dynamic pressure bearing section SB according to the present embodiment serves also as a pumping device that pressurizes the lubricating fluid within the thrust opposing region S towards the center, and the pressure difference (P1–P2) that is the pressurizing force caused by the pumping device is set larger than a rotational centrifugal force F that is applied during rotation to the lubricating fluid that is in a region of the thrust opposing region S more outward in the radial direction than the thrust dynamic pressure bearing section SB ((P1–P2)>F).

Furthermore, on the outermost circumference wall surface of the bearing sleeve 13, which is the dynamic pressure bearing member, is formed a fluid sealing section comprising a capillary sealing section 24. The capillary sealing section 24 that serves as the fluid sealing section is formed on the outer side in the radial direction adjacent to the thrust opposing region S including the thrust dynamic pressure bearing section SB in the axial direction; the capillary sealing section 24 is formed by an outer circumference wall surface of the bearing sleeve 13 and an inner circumference wall surface of a counter plate 25, which serves as a fall-out stopping member formed opposite the outer circumference wall surface of the bearing sleeve 13 in the radial direction. The counter plate 25 consists of a ring-shaped member fixed to a flange section 22e provided on the rotary hub 22; by gradually enlarging the gap between the inner circumference wall surface of the counter plate 25 and the outer circumference wall surface of the bearing sleeve 13 towards an opening section at the bottom, a tapered sealing space is formed. The lubricating fluid in the thrust dynamic pressure bearing section SB is continuously filled until it reaches the capillary sealing section 24.

At the top end part of the bearing sleeve 13 is a fall-out flange section 13b that projects outward in the radial direction, and a part of the fall-out flange section 13b is positioned opposite a part of the counter plate 25 in the axial direction. The members 13b and 25 prevent the rotary hub 22 from falling out in the axial direction.

In the present embodiment having such a configuration, the pressurizing force (P1–P2) of the thrust dynamic pressure bearing section SB, which also serves as the pumping device inward in the radial direction (towards the center), is in effect at all times at the outer circumference part of the entire thrust opposing region S including the thrust dynamic pressure bearing section SB; as a result, even if high-speed rotation takes place in a configuration in which the thrust dynamic pressure bearing section SB has a small diameter to reduce torque loss, the inward pressurizing force of the thrust dynamic pressure bearing section SB that also serves as the pumping device securely prevents the lubricating fluid from leaking outside.

In the present embodiment, the thrust dynamic pressure bearing section SB that comprises the dynamic pressure bearing generating device also serves as the pumping device, the overall structure of the device is simplified compared to a structure in which the two are separately provided.

Further in the present embodiment, by merely molding ordinary herringbone-shaped dynamic pressure generating grooves in an asymmetrical manner, the dynamic pressure generating device of the thrust dynamic pressure bearing section SB that also serves as the pumping device yields a bearing performance equivalent to or greater than conventional bearing performance, while effectively preventing the lubricating fluid from leaking outside.

Moreover in the present embodiment, due to the fact that the fluid sealing section provided on the thrust dynamic pressure bearing section SB consists of the capillary sealing section 24 formed by the outermost circumference wall surface of the bearing sleeve 13, the lubricating fluid is continuously filled in an area defined by the thrust dynamic pressure bearing section SB and the capillary sealing section 24; as a result, sufficient lubricating fluid is secured for the thrust dynamic pressure bearing section SB. In addition, even when various fall-out stopping members positioned in the area defined by the thrust dynamic pressure bearing section SB and the capillary sealing section 24 come in contact with each other due to external impact forces, the presence of the lubricating fluid effectively prevents burns and scuffing from occurring.

Figure 4:
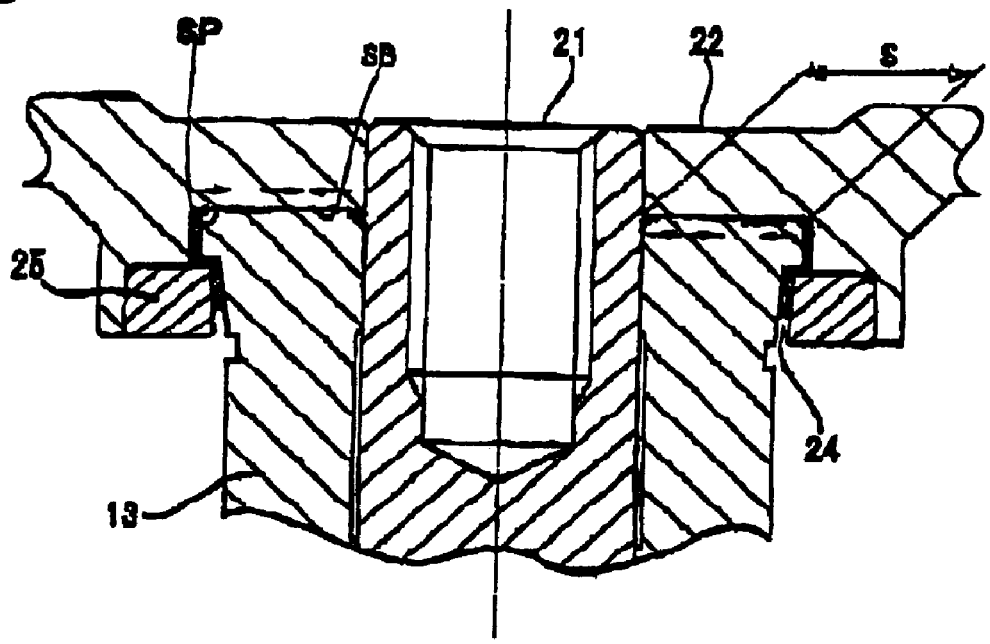
FIG. 4 shows an enlarged longitudinal cross section of a thrust dynamic pressure bearing section of a dynamic pressure bearing device in accordance with another embodiment of the present invention.
Figure 5:
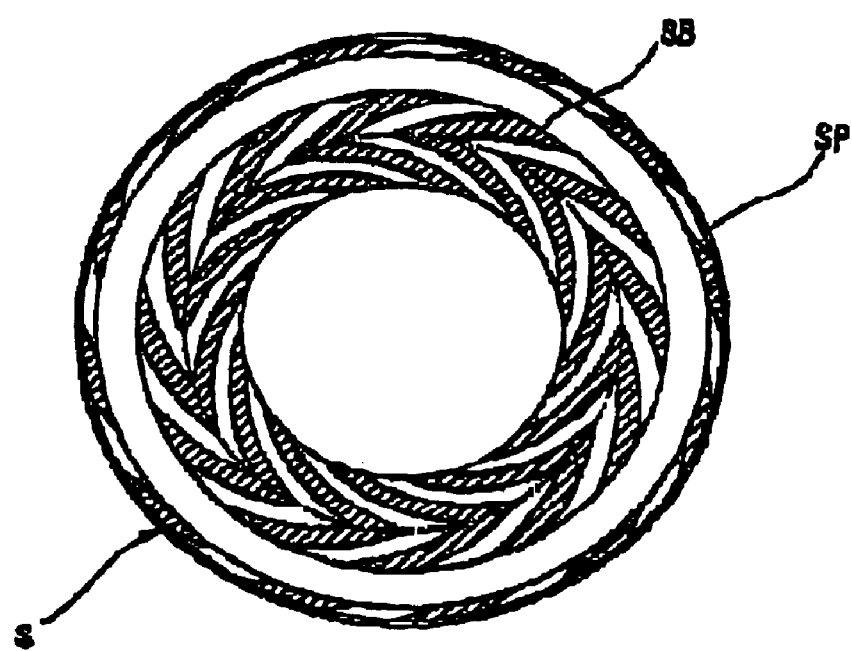
FIG. 5 shows a plan view of the shape of dynamic pressure generating grooves provided in the thrust dynamic pressure bearing section shown in FIG. 4.

In the meantime, in an embodiment indicated in FIGS. 4 and 5, where elements identical to elements in the embodiment described above are assigned the same numbers as in the previous embodiment, in a thrust opposing region S between a top end surface of a bearing sleeve 13 and a bottom end surface of a rotary hub 22, a thrust dynamic pressure bearing section SB with a small diameter and herringbone-shaped dynamic pressure generating grooves is provided towards the center. In an outer region in the radial direction of the thrust dynamic pressure bearing section SB is a pumping device SP that prevents a lubricating fluid within the thrust opposing region S from leaking outside, where the pumping device SP is provided separately from the thrust dynamic pressure bearing section SB. The pumping device SP according to the present embodiment consists of spiral-shaped dynamic pressure generating grooves and is positioned at the outermost circumference part of the thrust opposing region S.

Due to the fact that the pumping device SP is provided separately from the thrust dynamic pressure bearing section SB and in a region more outward in the radial direction than the thrust dynamic pressure bearing section SB according to the present embodiment, the thrust dynamic pressure bearing section SB has a structure that experiences less torque loss and the lubricating fluid is effectively prevented from leaking outside. Further, the thrust dynamic pressure bearing section SB having a structure similar to conventional thrust dynamic pressure bearings can be easily formed, while the configuration of the pumping device SP that prevents the lubricating fluid from leaking outside can be made simple.

Figure 6:
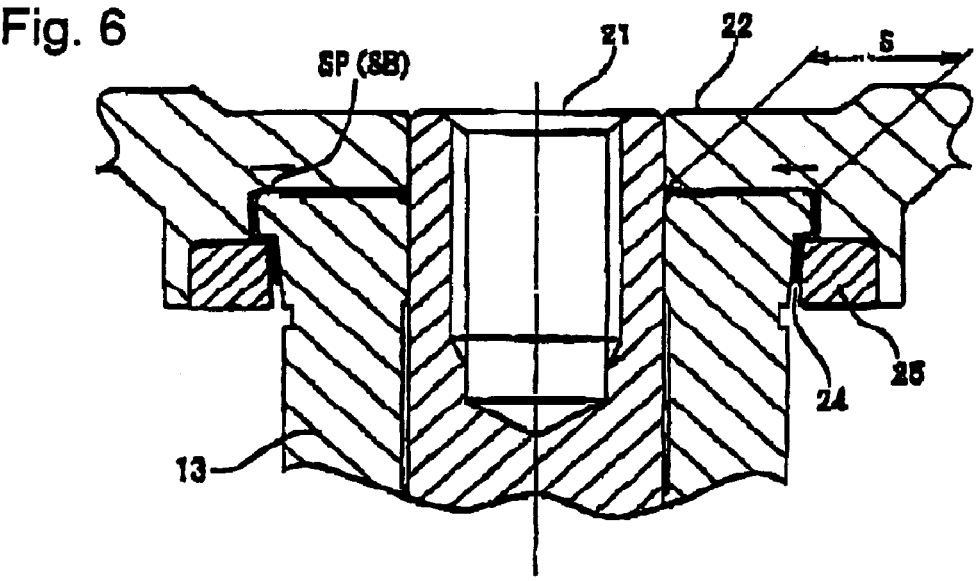
FIG. 6 shows an enlarged longitudinal cross section of a thrust dynamic pressure bearing section of a dynamic pressure bearing device in accordance with yet another embodiment of the present invention.
Figure 7:
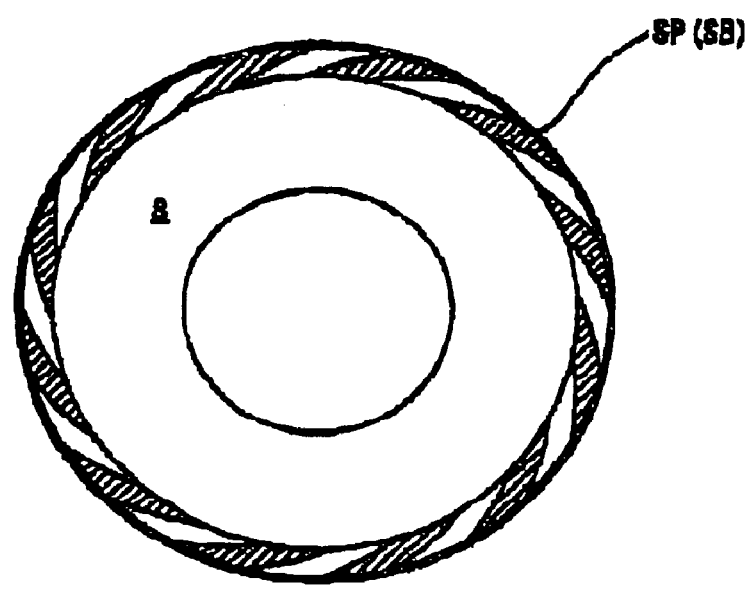
FIG. 7 shows a plan view of the shape of dynamic pressure generating grooves provided in the thrust dynamic pressure bearing section shown in FIG. 6.
Figure 8:
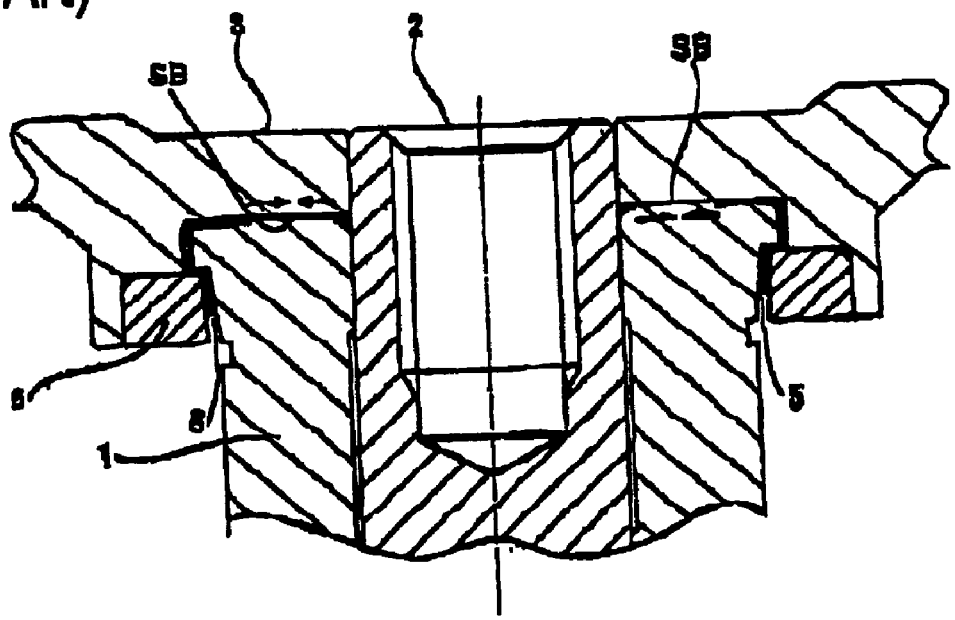
FIG. 8 shows an enlarged longitudinal cross section of a thrust dynamic pressure bearing section of a conventional dynamic pressure bearing device.
Figure 9:
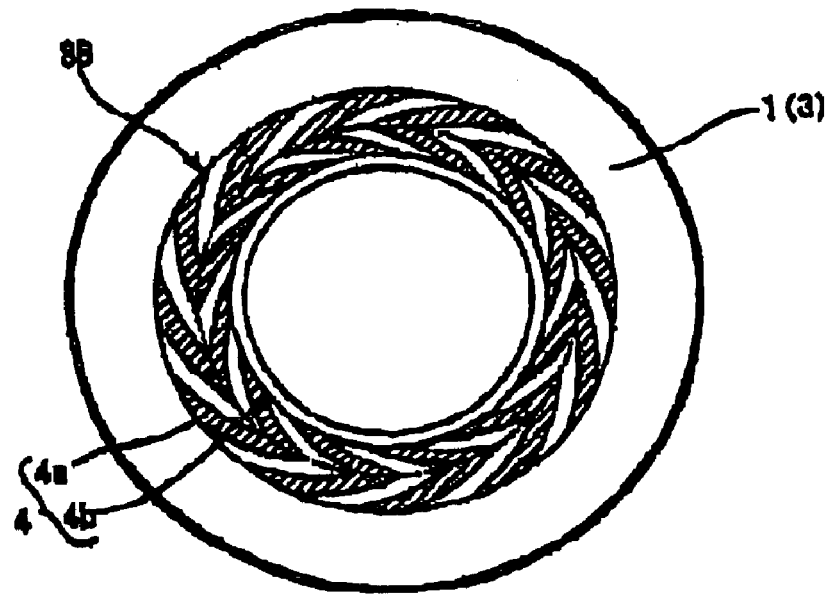
FIG. 9 shows a plan view of the shape of dynamic pressure generating grooves provided in the thrust dynamic pressure bearing section shown in FIG. 8.

In an embodiment indicated in FIGS. 6 and 7, where elements identical to elements in the embodiments described above are assigned the same numbers as in the previous embodiments, only a pumping device SP is provided and the pumping device SP is configured to serve also as a dynamic pressure generating device of a thrust dynamic pressure bearing section. In other words, the pumping device SP is formed by spiral-shaped dynamic pressure generating grooves, and an inward (towards the center) pressurizing force (pumping force) of the spiral-shaped dynamic pressure generating grooves yields both the dynamic pressure to levitate a thrust bearing and the dynamic pressure to prevent a lubricating fluid from leaking outside.

According to this embodiment, a dynamic pressure bearing device having an extremely simple and low-cost structure can cause the lubricating fluid to generate dynamic pressure for thrust levitation and effectively prevent the lubricating fluid from leaking outside, so that the structure can be simplified compared to a structure in which the two dynamic pressure generating device are separately provided.

The present invention by the inventor has been described in detail using embodiments, but the present invention is not limited to the embodiments described above and may modifications can be made without departing from the present invention.

For example, although each of the embodiments described above is an application of the present invention to an HDD spindle motor, the present invention can be applied similarly to various other types of dynamic pressure bearing devices.

As described above, in a dynamic pressure bearing device according to the present invention, a pumping device is provided in an outer circumference part within a thrust opposing region between a dynamic pressure bearing member and a rotary member, where the pumping device pressurizes a lubricating fluid inside the thrust opposing region with a pressurizing force inward in the radial direction larger than a rotational centrifugal force, so that there is a pressurizing force generated by the pumping device applied at all times inward in the radial direction (towards the center) at the outer circumference part of the entire thrust opposing region, including a thrust dynamic pressure bearing section; consequently, even if high-speed rotation were to take place in a configuration in which the thrust dynamic pressure bearing section has a small diameter to reduce torque loss, the inward pressurizing force of the pumping device with a simple configuration securely prevents the lubricating fluid from leaking outside and can improve the reliability of the dynamic pressure bearing device while also making the device smaller and thinner.

In a dynamic pressure bearing device according to the present invention, due to the fact that a pumping device is provided separately from a thrust dynamic pressure bearing section in order to securely prevent a lubricating fluid from leaking outside while improving the performance of the dynamic pressure bearing device, effects described above can be securely obtained.

Further in the dynamic pressure bearing device according to the present invention, due to the fact that a dynamic pressure generating device of the thrust dynamic pressure bearing section consists of herringbone-shaped dynamic pressure generating grooves and to the fact that the pumping device consists of spiral-shaped dynamic pressure generating grooves, the thrust dynamic pressure bearing section having a structure similar to conventional thrust dynamic pressure bearings can be easily formed while the configuration of the pumping device that effectively prevents the lubricating fluid from leaking outside can be made simple; as a result, in addition to obtaining the effects described above, productivity can be improved.

Moreover, in a dynamic pressure bearing device according to the present invention, due to the fact that a dynamic pressure generating device of a thrust dynamic pressure bearing section is provided to serve also as a pumping device, the overall structure is simplified; as a result, in addition to obtaining the effects described above, productivity can be improved further.

In the dynamic pressure bearing device according to the present invention, the dynamic pressure generating device of the thrust dynamic pressure bearing section that also serves as the pumping device consists of herringbone-shaped dynamic pressure generating grooves; by forming the width of groove sections on the outer side in the radial direction larger than the width of groove sections on the inner side in the radial direction of the herringbone-shaped dynamic pressure generating grooves and by merely molding ordinary herringbone-shaped dynamic pressure generating grooves in an asymmetrical manner, bearing performance equal to or greater than conventional bearing performance can be obtained, while effectively preventing the lubricating fluid from leaking outside; as a result, in addition to obtaining the effects described above, productivity can be improved.

Furthermore, in a dynamic pressure bearing device according to the present invention, due to the fact that a pumping device consists of spiral-shaped dynamic pressure generating grooves and to the fact that the pumping device also serves as a thrust dynamic pressure bearing section, a dynamic pressure bearing device having an extremely simple and low-cost structure can have a lubricating fluid generate dynamic pressure for thrust levitation and effectively prevent the lubricating fluid from leaking outside; as a result, in addition to obtaining the effects described above, productivity can be improved further.

Moreover, in the dynamic pressure bearing device according to the present invention, due to the fact that a fluid sealing section consists of a capillary sealing section formed by an outer circumference wall surface of a dynamic pressure bearing member, sufficient lubricating fluid is secured for the thrust dynamic pressure bearing section, and burns and scuffing are effectively prevented due to the presence of the lubricating fluid even when members in an area defined by the thrust dynamic pressure bearing section and the capillary sealing section come into contact with each other; as a result, in addition to obtaining the effects described above, life and reliability of the dynamic pressure bearing device can be further improved.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A dynamic pressure bearing device comprising:
   a shaft;
   a rotary member being fixed on one end of said shaft;
   a dynamic pressure bearing member having a center hole, said shaft being inserted into the hole in a freely rotatable manner relative to the dynamic pressure bearing member;
   a thrust dynamic pressure bearing section provided in a thrust opposing region where an end surface in an axial direction of the dynamic pressure bearing member is opposed to an end surface in the axial direction of the rotary member by a minuscule gap therebetween, wherein the thrust dynamic pressure bearing section rotatably supports the rotary member in the axial direction of the rotary member;
   a radial dynamic pressure bearing section provided in a minuscule gap section where an outer circumference surface of said shaft is opposed to an inner circumference surface of said hole by a minuscule gap therebetween, the minuscule gap section extending in the axial direction to reach said thrust opposing region along the outer circumference surface of said shaft;

lubricating fluid filling continuously from said minuscule gap of said thrust opposing region to said minuscule gap of said minuscule gap section;

a cover, closing an opening section at a bottom end of said hole to prevent said lubricating fluid inside of said radial dynamic pressure bearing section from leaking outside;

a pumping device provided in an outer circumference part of the thrust opposing region to pressurize a lubricating fluid inside the thrust opposing region inwardly in a radial direction, wherein the pumping device generates an inward pressurizing force larger than a rotational centrifugal force applied to the lubricating fluid within the thrust opposing region during rotation.

2. A dynamic pressure bearing device according to claim 1, further comprising a fluid seal section provided in a section continuous with the thrust opposing region on an outer side in the radial direction of the thrust dynamic pressure bearing section to prevent the lubricating fluid inside the thrust dynamic pressure bearing section from flowing outwardly.

3. A dynamic pressure bearing device according to claim 2, wherein the fluid sealing section includes a capillary sealing section formed by an outer circumference wall surface of the dynamic pressure bearing member.

4. A dynamic pressure bearing device according to claim 1, wherein the pumping device is provided separately from the thrust dynamic pressure bearing section, and the pumping device is positioned in a region more outward in the radial direction than the thrust dynamic pressure bearing section.

5. A dynamic pressure bearing device according to claim 4, wherein the thrust dynamic pressure bearing section includes a dynamic pressure generating device comprising herringbone-shaped dynamic pressure generating grooves, and the pumping device has spiral-shaped dynamic pressure generating grooves.

6. A dynamic pressure bearing device according to claim 1, wherein the thrust dynamic pressure bearing section includes a dynamic pressure generating device that serves as the pumping device.

7. A dynamic pressure bearing device according to claim 6, wherein the dynamic pressure generating device of the thrust dynamic pressure bearing section comprises herringbone-shaped dynamic pressure generating grooves, made up of groove sections on the outer side in the radial direction and groove sections on the inner side in the radial direction, wherein a width in the radial direction of the groove sections on the outer side in the radial direction is greater than a width in the radial direction of the groove sections on the inner side in the radial direction of the herringbone-shaped dynamic pressure generating grooves.

8. A dynamic pressure bearing device according to claim 1, wherein the pumping device consists of spiral-shaped dynamic pressure generating grooves, wherein the pumping device also serves as a dynamic pressure generating device for the thrust dynamic pressure bearing section.

9. A dynamic pressure bearing device comprising;
a shaft;
a rotor member being fixed on one end of said shaft;
a stator member having a center hole, said shaft being inserted into the hole in a rotatable manner with respect to the stator member;

a thrust dynamic pressure bearing section provided in a thrust opposing region where an end surface in an axial direction of the stator member is opposed to an end surface in the axial direction of the rotor member, wherein the thrust dynamic pressure bearing section rotatably supports the rotor member in the axial direction of the rotor member with herringbone-shaped dynamic pressure generating grooves;

a radial dynamic pressure bearing section provided in a minuscule gap section where an outer circumference surface of said shaft is opposed to an inner circumference surface of said hole by a minuscule gap therebetween, the minuscule gap section extending in the axial direction to reach said thrust opposing region along the outer circumference surface of said shaft;

lubricating fluid filling continuously from said thrust opposing region to said minuscule gap section of said radial dynamic pressure bearing section;

a cover, closing an opening section of said hole at the other end surface of the stator member to prevent said lubricating fluid inside of said radial dynamic pressure bearing section from leaking outside;

a pumping device that is provided in the thrust opposing region to pressurize the lubricating fluid inside the thrust opposing region inwardly in the radial direction, and generates an inward pressurizing force greater than a rotational centrifugal force applied to the lubricating fluid within the thrust opposing region during rotation; and a fluid seal section provided in a section continuous with the thrust opposing region on an outer side in the radial direction of the thrust dynamic pressure bearing section to prevent the lubricating fluid on the inside of the thrust dynamic pressure bearing section from flowing outwardly.

10. A dynamic pressure bearing device according to claim 9, wherein the pumping device is provided adjacent to an outer circumference part of the thrust opposing region in the radial direction.

11. A dynamic pressure bearing device according to claim 9, wherein the thrust dynamic pressure bearing section includes a thrust dynamic pressure generating device that generates a dynamic pressure by pumping a lubricating fluid and supports the rotor member by the dynamic pressure generated in the lubricating fluid.

12. A dynamic pressure bearing device according to claim 11, wherein the thrust dynamic pressure generating device is integral with the pumping device.

13. A dynamic pressure bearing device according to claim 12, wherein the thrust dynamic pressure generating device that is integral with the pumping device is provided adjacent to an outer circumference part of the thrust opposing region in the radial direction.

14. A dynamic pressure bearing device according to claim 13, wherein the dynamic pressure generating device that is integral with the pumping device comprises the herringbone-shaped dynamic pressure generating grooves, the herringbone-shaped dynamic pressure generating grooves being made up of groove sections on the outer side in the radial direction and groove sections on the inner side in the radial direction, wherein a width in the radial direction of the groove sections on the outer side in the radial direction is greater than a width in the radial direction of the groove sections on the inner side in the radial direction of the herringbone-shaped dynamic pressure generating grooves.

15. A dynamic pressure bearing device according to claim 13, wherein the fluid sealing section includes a capillary sealing section formed by an outer circumference wall surface of the dynamic pressure bearing member.

16. A dynamic pressure bearing device according to claim 9, wherein the pumping device is provided separately from the thrust dynamic pressure bearing section, and the pumping device is positioned in a region more outward in the radial direction than the thrust dynamic pressure bearing section.

17. A dynamic pressure bearing device according to claim 16, wherein the thrust dynamic pressure bearing section includes a thrust dynamic pressure generating device that generates a dynamic pressure by pumping a lubricating fluid and supports the rotor member by the dynamic pressure generated in the lubricating fluid.

18. A dynamic pressure bearing device according to claim 17, wherein the dynamic pressure generating device comprises the herringbone-shaped dynamic pressure generating grooves, and the pumping device has spiral-shaped dynamic pressure generating grooves.

19. A motor comprising;
a shaft;
a rotor unit being fixed on one end of said shaft;
a stator unit having a center hole, said shaft being inserted into the hole in a rotatable manner with respect to the stator unit;
a thrust dynamic pressure bearing section provided in a thrust opposing region where an end surface in an axial direction of the stator unit is opposed to an end surface in the axial direction of the rotor unit by a minuscule gap therebetween; and
a radial, dynamic pressure bearing section provided in a minuscule gap section where an outer circumference surface of said shaft is opposed to an inner circumference surface of said hole by a minuscule gap therebetween, the minuscule gap section extending in the axial direction to reach said thrust opposing region along the outer circumference surface of said shaft;
lubricating fluid filling continuously from said minuscule gap of said thrust opposing region to said minuscule gap of said minuscule gap section;
a cover, closing an opening section at a bottom end of said hole to prevent said lubricating fluid inside of said radial dynamic pressure bearing section from leaking outside;
a pumping device that is provided in the thrust opposing region to pressurize the lubricating fluid inside the thrust opposing region inwardly in the radial direction, and generates an inward pressurizing force greater than a rotational centrifugal force applied to the lubricating fluid within the thrust opposing region during rotation of the rotor unit.

20. A motor according to claim 19, further comprising a fluid seal section provided in a section continuous with the thrust opposing region on an outer side in the radial direction of the thrust dynamic pressure bearing section to prevent the lubricating fluid on the inside of the thrust dynamic pressure bearing section from flowing outwardly.

* * * * *